United States Patent [19]

Waitkus et al.

[11] Patent Number: 4,624,811

[45] Date of Patent: Nov. 25, 1986

[54] PROCESS FOR PREPARING A VITREOUS CARBON

[75] Inventors: Phillip A. Waitkus; Louis L. Korb, both of Sheboygan, Wis.

[73] Assignee: Plastics Engineering Company, Sheboygan, Wis.

[21] Appl. No.: 782,314

[22] Filed: Oct. 1, 1985

Related U.S. Application Data

[63] Continuation-in-part of Ser. No. 668,396, Nov. 5, 1984, abandoned, which is a continuation of Ser. No. 502,181, Jun. 8, 1983, abandoned, which is a continuation-in-part of Ser. No. 356,893, Mar. 10, 1982, abandoned, which is a continuation of Ser. No. 182,755, Aug. 29, 1980, abandoned, which is a continuation-in-part of Ser. No. 50,531, Jun. 21, 1979, abandoned.

[51] Int. Cl.$^4$ .................. C01B 31/02; C01B 31/04
[52] U.S. Cl. .................................. 264/29.5; 264/29.7
[58] Field of Search .......... 423/449; 264/29.5, 331.22, 264/29.7

[56] References Cited

U.S. PATENT DOCUMENTS

| | | | |
|---|---|---|---|
| 3,410,718 | 11/1968 | Smith | 525/501 |
| 3,879,338 | 4/1975 | Grazen et al. | 525/501 |
| 3,927,140 | 12/1975 | Rice et al. | 525/501 |
| 3,998,906 | 12/1976 | Rice et al. | 525/501 |
| 4,166,145 | 9/1979 | Hatch et al. | 264/29.5 |
| 4,197,385 | 4/1980 | Laitar | 525/501 |
| 4,251,408 | 2/1981 | Hesse et al. | 525/501 |
| 4,252,900 | 2/1981 | Funabiki et al. | 525/501 |

FOREIGN PATENT DOCUMENTS

| | | | |
|---|---|---|---|
| 53-75294 | 7/1978 | Japan | 525/491 |
| 1098029 | 1/1968 | United Kingdom | |

*Primary Examiner*—Allan M. Lieberman
*Attorney, Agent, or Firm*—Walter J. Monacelli

[57] ABSTRACT

The process for producing a vitreous carbon involves the molded product of a moldable composition produced from co-reacted mixtures of powder or otherwise blendable form of 20-80% by weight of a phenolic-furfuraldehyde Novolac resin and of 20-80% by weight of phenolic-aldehyde resol resin dispersed in water, either in solution or suspension, the percentages being based on the combined weight of the Novolac and resol resins, and the aldehyde in said Novolac resin comprising at least 50 molar percent, preferably substantially 100 percent, furfuraldehyde. The composition advantageously contains an amine such as hexamethylenetetramine ("hexa") in an amount equivalent to 1-15%, preferably 2-10% of hexamethylenetetramine based on the total amount of phenolic component. The composition is made by adding the preformed phenol-furfuraldehyde Novolac to the resol resin prior to dehydration of the resol resin to produce a grafted polymerization product of improved properties. The composition is particularly useful in admixture with a carbonaceous filler, preferably graphite in a proportion as high as 76% by weight based on the total composition. Generally in such admixtures the graphite may comprise 30-76%, advantageously 35-65% and preferably 40-60% of the molding composition. The vitreous carbon is improved in electrical properties and in the capability of being suitably molded, carbonized and graphitized into large shapes, particularly thin plates which are much more stress-free and crack or pore-free than otherwise produced.

31 Claims, 1 Drawing Figure

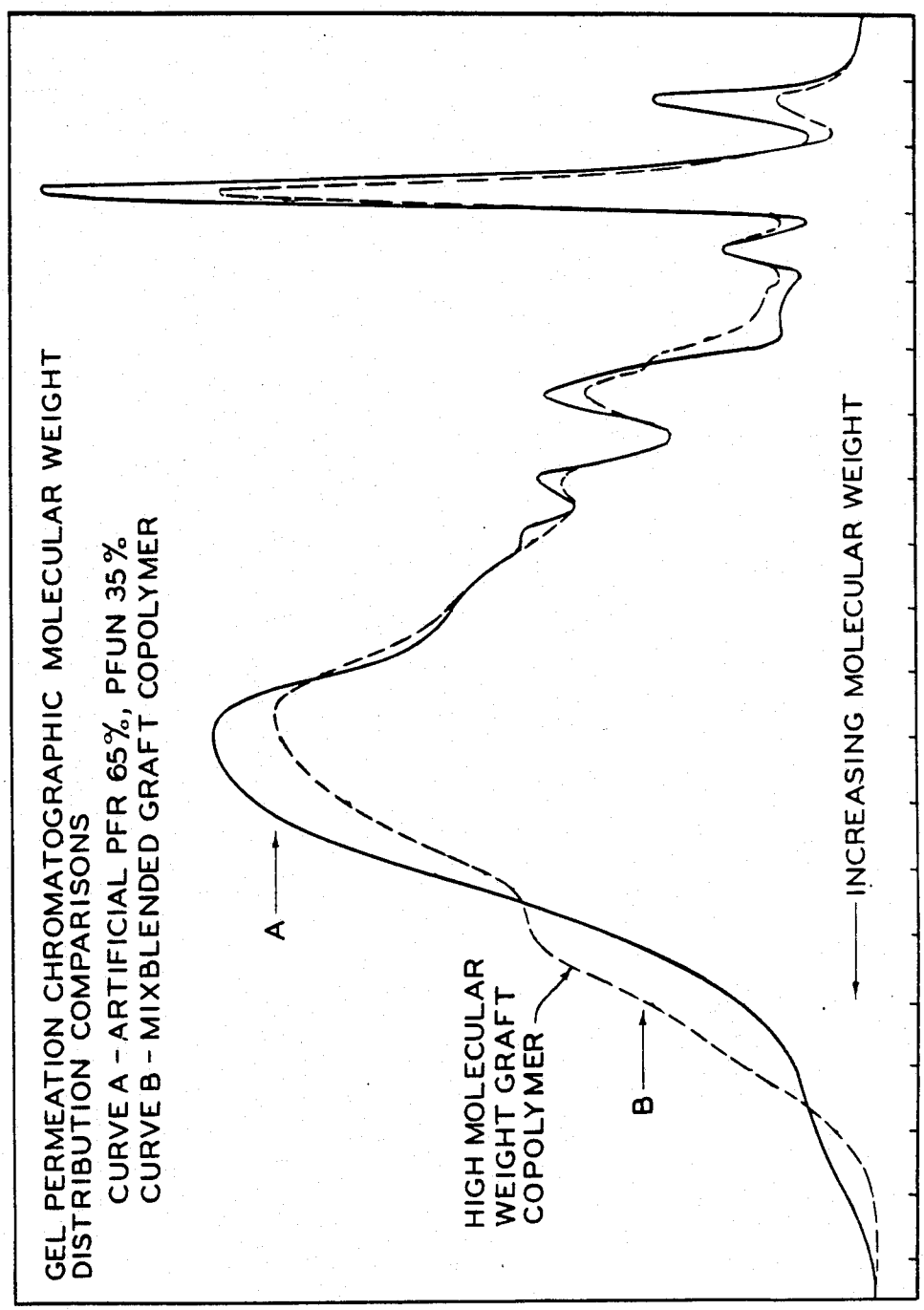

PROCESS FOR PREPARING A VITREOUS CARBON

This application is a continuation-in-part application of copending application Ser. No. 06/668,396 filed Nov. 5, 1984, now abandoned, which is a continuation of application Ser. No. 502,181, filed June 8, 1983, now abandoned, which in turn is a continuation-in-part of application Ser. No. 356,893 filed Mar. 10, 1982, now abandoned, which in turn is a continuation of application Ser. No. 182,755 filed Aug. 29, 1980, now abandoned, which in turn is a continuation-in-part of application Ser. No. 050,531 filed June 21, 1979, now abandoned.

BACKGROUND OF THE INVENTION

1. Field of the Invention

This invention relates to new vitreous carbon compositions derived from the addition of a phenol-furfuraldehyde Novolac to a phenol-aldehyde "resol" resin. More specifically, it relates to the production of vitreous carbon in large, molded sizes, particularly large thin plates produced by appropriately compressed and molded shaped articles which are carbonized and then graphitized to excellent vitreous carbon with low percentages of failures or rejects. Still more specifically, it relates to a process for making such vitreous carbon products.

2. State of the Prior Art

The extreme inertness and non-porosity of vitreous carbon qualifies it as an important and useful material of construction for use in a number of applications and in various industries. For research and development work this material has been used in fabricating beakers, basins, boats, reaction tubes, etc., and for extensive use in the processing of semiconductors, fluoride laser materials, zone refining of metals, zone refining of chemicals, biomedical applications, fuel cell electrodes, etc.

However, industrial applications of vitreous carbon have been made only in recent years. Since vitreous carbon is not wet by a wide range of metals including zinc, silver, copper, tin, lead, aluminum, gold, platinum and others, it has found application in the processing of some of these metals and their alloys, for example, in the dehydrogenation of molten aluminum with chlorine gas. Dip pipes of this material for corrosive liquids have also been successfully used.

The growth of industrial applications for this material has been restricted in large measure by the inability to produce properly cured moldings or extrusions in the required shapes and by use of conventional molds or dies at conventional rates and reasonable cost. There has been difficulty in making large thin plates suitable for use in fuel cells.

A "resol" resin is the resinous reaction product of a phenol and an aldehyde which has been condensed (reacted) only to a stage where it still melts when heated and is still soluble in acetone, and the resin still has sufficient residual reactivity that it may be cured by heat without the addition of a curing agent to an insoluble and infusible condition. A resol resin is also known as an "A" stage phenolic resin, or also as a "single stage" resin, because it is curable without the addition of any crosslinking agent.

The "resol" resin is prepared by using the aldehyde in a molar proportion greater than 1-1 with the phenol. Since sufficient aldehyde is already present to give a cure to the insoluble, infusible state, there is no need to add a curing agent such as hexa for final curing. However, in preparing the resol resin, it may be desirable to add a small amount of hexa to obtain a harder and more easily grindable resol. For example, 0.005 to 0.03 mole, preferably 0.01 mole of hexa per mole of phenol is advantageous for this purpose. In any case, the amount of hexa used in preparing the resol is not calculated in the amount which may be subsequently added to aid in the curing of the Novolac-resol mixture.

In contrast, a "Novolac" resin is one prepared with a deficiency in aldehyde so that it may not be cured unless a curing agent such as hexa is added. Therefore, a "Novolac" resin may be defined as the resinous reaction product of a phenol and an aldehyde that, for all practical purposes, does not harden or convert to an insoluble, infusible condition upon heating, but remains soluble and fusible.

In starting with resin particles as described in said pending application, it has been found particularly important that the Novolac is a phenolfurfuraldehyde resin. When the Novolac is one using furfuraldehyde, pressures are suitable for compressing the resin mixture into the desired shapes for molding which are not suitable for Novolacs made with other aldehydes. As shown hereinafter, this becomes evident in the number of rejects produced when the molded objects are carburized to vitreous carbon.

In the parent applications, Ser. Nos. 182,755, 356,893 and 502,181, a number of references were cited with respect to coreaction of Novolac and resol resins. These include U.S. Pat. Nos. 3,998,906, 3,927,140, 3,879,338, 3,410,718, Japanese Patent No. 53-75294 and British Patent No. 1,090,029. While these references relate to curing various mixtures of resins, none of these pertain to water removal from the various mixtures so as to produce a moldable composition, particularly one which may be subsequently mixed with a carbonaceous filler such as graphite for further processing into vitreous carbon products.

SUMMARY OF THE INVENTION

In accordance with the present invention, it has been found that resin compositions of excellent molding plasticity may be prepared by adding 20–80 percent by weight of a phenolic-furfuraldehyde Novolac resin to an aqueous solution or suspension of 20–80 percent by weight of a phenolic-aldehyde resol resin, preferably in the early stage of formation of the resol resin; the percentages being based on the combined weight of the two resins, together with an appropriate amount of an amine, such hexamethylenetetramine ("hexa"), the hexa and the Novolac resin being added separately or simultaneously to the resol resin prior to completion of dehydration or water removal from the resol resin. The hexa may be added all in one amount or in two or more increments anytime up to removal of 90% of the water, preferably before removal of 75% of the water. The Novolac may be added advantageously after the resol components have been reacted for about 30 minutes at about 90° C. and advantageously before any substantial amount of water has been removed. In preparing the Novolac which is to be added to the resol, at least 25 percent of the water present during the Novolac preparation is removed, advantageously after at least 35 percent and preferably at least 50% or 75% of the water has been removed, and still more preferably after substantially all of that water has been removed, prior to the Novolac addition to the resol. The preferred ratios of parts by weight of Novolac to parts by weight of resol prior to co-reaction are in the range of 30/70 to 50-50, or reversely the ratio of parts by weight of resol to parts by weight of Novolac is in the range of 50/50 to 70/30.

In referring to the "removal of water" in a resin or in the formation of the resin it is intended to include water present in a component, such as water in aqueous formaldehyde, or in aqueous caustic solution, etc., water added as such, and water formed by the resin condensation reaction. The amount of water may be easily determined by first running a reaction in which water is completely removed. Then subsequent reactions may be performed in which only portions of the water are removed.

In place of hexa there may be used various amines as described more fully hereinafter. The hexa, or other amine, serves two functions. First it serves to harden the resol component and to prevent premature gelation and also serves to avoid premature gelation when the Novolac is added. The avoidance of premature gelation is important in permitting complete removal of water from the mixed reaction product to give a grindable product that may be subsequently cured in a molding composition.

Advantageously an appropriate amount of hexa is added to the components for the resol, or preferably after the refluxing of the resol components has been conducted to a stage where the formaldehyde is substantially all reacted or may be added anytime before or after the Novolac is added and up to the time 90 percent of the water initially present has been removed, preferably before 75 percent of the water has been removed.

The amount of amine is advantageously equivalent to 1-15 percent by weight, preferably 2-10 percent by weight of hexa based on the total weight of phenolic component. Also based on the total weight of resin product, the amine is advantageously equivalent to 0.5 to 6%, preferably 1 to 5 percent by weight.

After the hexa and Novolac addition are completed, the dehydration or water removal is continued to a stage where a grindable resin is obtained upon cooling the reaction mass. The resin product has a molding plasticity particularly suitable for giving excellent flow for carbonaceous-filled, such as graphite-filled, molding compositions which are particularly suited for graphitization to produce stress-free and pit and pore-free vitreous carbon.

In curing a Novolac resin, a substantial amount of a curing agent is used such as hexa to overcome the deficiency of aldehyde-bridging groups. This added curing agent may be an aldehyde such as formaldehyde or an alkylene-providing compound, such as hexamethylenetetramine which provides methylene groups for curing. However, when a substantial amount of such a curing agent is used in preparing a cured Novolac resin for ultimate vitreous carbon formation, there is generally sufficient by-product gas formed or retained so that in the later stages of the resin processing, molded-in stresses may be formed. In any case, the products do not have the properties desired.

By the composition and process of this invention, it has been found possible to prepare resins for ultimate formation of vitreous carbon of very good properties by virtue of the fact that at least most or substantially all of the final bridging between phenolic groups is effected through methylol groups present in the resol rein to produce a resin of excellent molding plasticity. Thus the necessity for adding a curing agent to the ultimate product to provide bridging groups for the Novolac molecules is eliminated or reduced. The carbonizable phenolic resin produced from the composition of this invention is the coreaction product of a phenolic-furfural Novolac resin and a resol resin plus the added hexa. Some of this co-reaction may take place during the dehydration of the resol.

This co-reacted resin product has a plasticity that makes it particularly suitable for mixture with finely divided carbonaceous fillers such as graphite to give products having molding plasticity satisfactory to give molded products of less stress and strain which, in turn on graphitization, gives vitreous carbon products of excellent properties, free of pits and pores and sufficiently free of cracks and microcracks to reduce and practically eliminate rejection of the same for rupture or failure of permeability tests to determine suitability of these for separator plates in fuel cells.

It is believed that the phenol furfural Novolac has a plasticizing effect on the co-reacted resol resin which allows the resultant viscous mass to flow uniformly and readily at lower pressure to completely fill the mold before a high degree of gelation and crosslinking occurs. This contrasts with the initially faster curing rates of the single stage resins (resols) which create large initial portions of gelled or crosslinked polymer molecules, thereby also forming local stressed areas in the molded part. This plasticizing effect is believed to allow the production of molded shapes and forms which are substantially free of molded-in stress. This allows the formed product to be ejected from a hot mold without distortion or deformation. Moreover, when the molded product is carbonized to vitreous carbon, this stress-free condition carries over into the final product to produce excellent properties therein.

While mixtures of finely divided preformed phenol-furfuraldehyde Novolacs (PFUN) and finely divided preformed phenol-aldehyde resols (PFR) have been found effective by the process of applicants' above-mentioned prior application Ser. No. 50,531 in the preparation of otherwise difficult to form vitreous carbon shapes, it has now been found that compositions effective for this purpose can be prepared by adding a preformed phenolic-furfuraldehyde Novolac resin to a solution of phenol-aldehyde resol resin polymerized to a stage in which the product has not been substantially dehydrated. The Novolac resin can be completely dehydrated prior to such addition or may be preformed but still in the undehydrated stage.

A particularly difficult shape to mold, carburize and graphitize effectively is a plate having a molded and ultimate thickness of 0.04-0.05, preferably about 0.045". Vitreous carbon plates of this thickness and with other appropriate dimensions, such as about 20-25"×25-30" and even as high as 50"×50" if impervious to gas and liquids, are useful in fuel cells. By the methods disclosed in the above-mentioned application, applicants have improved the impermeability of such plates as would not be obtained without applicants' technique. When any depressions or cracks run completely through the plate, the plate is made permeable and must be rejected. The improved technique of blending the resins before dehydration and co-reacting the resins during dehydration produces products with excellent impermeability even with thicknesses of 0.045 inch. With this eliminated and thereby the cost of acceptable plates reduced.

Gel permeation chromatogram and carbon-13 nuclear magnetic resonance spectrum show that in the blend effected prior to dehydration there is a slight decrease in the molecular weight of the high molecular weight portion of the PFUN and there is a grafting of low molecular weight material to the PFUN. This low molecular weight material is believed to be low molecular weight hydroxymethylphenol and bis(hydroxmethyl)phenol.

FIG. 1 represents two gel permeation chromatogram curves superimposed on each other. Curve A represents the gel permeation chromatogram of a mixture effected with preformed PFUN and PFR particles according to the procedure of application Ser. No. 50,531. Dotted Curve B is a gel permeation chromatogram of a blend effected by adding the same PFUN to a similar PFR as used for Curve A but prior to dehydration of the same as effected by the procedure described below in Example V, but adding 35 parts of PFUN per 65 parts of PFR. Proportions and other conditions are as identical as possible. Curve B shows a hump at the left side of the high molecular weight curve at the left. This is believed to represent the grafting of material as discussed above.

The carbon-13 nuclear magnetic resonance spectrum reflects the grafting phenomenon by a reduction in free hydroxymethyl group resonance at 58–60 ppm and changes in the substitution pattern of the phenolic group as shown by the resonance in the range of 152–157 ppm.

Novolac and resol resins may be prepared by the condensation of a large variety of phenols and aldehydes as described in "The Chemistry of Synthetic Resins" by Carleton Ellis, Vol. 1, page 315, Reinhold Publishing Co., N.Y., N.Y. (1935). The author describes numerous phenolic-aldehyde resins in Chapters 13–18, modified phenol-aldehyde resins in Chapter 19, and modified phenol-formaldehyde resins in Chapter 20.

Typical examples of the phenolics which may be used are: phenol itself and its various homologs such as meta-cresol; the various xylenols, hydroquinone, pyrogallol; resorcinol; the halogenated derivatives of phenol which leave two or more positions available for condensation with the aldehyde, such as p-chlorophenol, p-bromophenol, p-fluorophenol, etc.; the various naphthols, the various hydroxy-benzoic acid esters; p,p'-dihydroxydiphenylmethane; p,p'-dihydroxydiphenyl-2,2'-diphenylpropane, etc. Ortho- and para-cresol may also be used when mixed with another phenol, such as metal-phenol, which has three available reactive positions such as ortho and para to permit crosslinking. For economic and availability reasons, phenol itself is preferred.

Similarly, a wide variety of aldehydes may be used in preparing the resol resins for use in the present invention. Typical examples are formaldehyde, paraformaldehyde, acetaldehyde, butyraldehyde, glyoxal, acrolein, benzaldehyde, terephthaldehyde, etc. Again, for reasons of cost and availability and for ease in processing, formaldehyde is preferred. The term "aldehyde" is intended to include not only aldehydes per se, that is compounds containing the —CHO group, but also compounds which, under reaction conditions, can engender an aldehyde or provide the same type of alkylene group for bridging as provided by the aldehyde. For example, hexamethylenetetramine provides methylene bridging groups, and acetylene under appropriate conditions with phenol, produces resins similar to those produced from phenol and acetaldehyde.

The appropriate molar ratio of aldehyde to phenol for preparing the Novolac and for preparing the resol respectively depends upon the nature of the aldehyde and the nature of the phenol and the conditions under which they are reacted.

With furfuraldehyde (furfural) as the condensing aldehyde for the Novolac, the proportion is advantageously in the range of about 0.6–0.9, preferably about 0.70–0.75 mole per mole of phenol. The furfural may be added all at once or in two or more stages.

The primary requirement is that the Novolac conforms to the accepted definition of a Novolac, namely that the phenolic-aldehyde resin will not cure merely upon heating and therefore for all practical purposes, is not heat-convertible to an insoluble, infusible product.

A further requirement of the Novolac is that it must be capable of conversion to an insoluble, infusible product by heat reaction with added amounts of an aldehyde, such as formaldehyde or an aldehyde reactive type of compound such as hexa. (See Ellis as cited above, p. 327.) Thus the Novolac may be tested by the addition of 10% by weight of hexa and heated. A true Novolac will be cured to an insoluble, infusible resin. If the material is not so cured upon testing, an additional amount of hexa may be added and the test repeated. If still no cure, the material is definitely not a Novolac. For use in the practice of this invention, the Novolac must meet this curing test to insure that it will be capable of curing with the resol to an insoluble, infusible state.

Thus in the practice of this invention most of the crosslinking bridges of the Novolac are formed by the resol. The hexamethylenetetramine added with the Novolac supplements the crosslinking bridges formed by the resol. However, the amount of hexa may be an amount that will produce the desired effect but still be low enough to avoid the disadvantages described above. As indicated above, this amount is advantageously 0.12 to 12 or preferably 2 to 8 parts by weight per hundred parts of the weight of Novolac resin.

As indicated above, various amine may be used in place of the hexa to perform a similar function. These amines include ammonia and any amine having a free hydrogen attached to the nitrogen atom such as mono and dialkylamines, e.g., methylamine, dimethylamine, ethylamine, diethylamine, butylamine, dibutylamine, decylamine, etc., mono and diarylamines such as aniline, diphenylamine, benzidine, methylendianiline, etc., monoaryl-monoalkylamines such as N-methylaniline, N-ethylaniline, N-propyl-tolylamine, etc. Advantageously the hydrocarbon groups have between 1–21 carbon atoms preferably 1–10 carbon atoms.

Resols are prepared from phenols and aldehydes over a wide molar ratio of reagents depending on the particular phenol and particular aldehyde. In this case also, a generalization can be made when the phenolic compound is phenol and the aldehyde is formaldehyde. Phenol-formaldehyde resols are usually prepared under alkaline or basic conditions, or in the presence of metal salts such as zinc acetate, to give resinous condensation products having a number of unreacted methylol groups as well as methylene bridges, both derived from the aldehyde. The ratio of formaldehyde to phenol varies for resols, preferably from a ratio of 1.05/1 to 1.5/1. In some formulations, some of the bridging groups may be supplied by hexa.

The available methylol groups in the resol are likewise the active functional groups which coreact with the Novolac to effect bridging and thereby produce the thermoset resin used in subsequent carbonization to produce vitreous carbon.

In preparing the furfural-phenol Novolac, an alkaline catalyst is preferred to obtain a controlled condensation. An acid catalyst is avoided since the acid is likely to initiate additional polymerization through the ethylenic unsaturation in the furan ring, which has a cyclic diene-ether structure.

In contrast, when producing a Novolac with furfural under alkaline conditions, such as with sodium carbonate, a furfural-to-phenol molar ratio of 0.60/1 to 0.90/1, preferably 0.70 to 0.75, produces a Novolac which upon normal heating will not cure, but will do so upon the addition of formaldehyde or hexa. However, if an acid is present during the initial condensation or is added thereafter, the resin can undergo additional reaction which may be misinterpreted and the resin considered to be resol in character. For example, if a furfural Novolac is treated with a strong acid, a vinyl-type addition reaction will be promoted and the resultant additional polymerization will effect bridging between polymer molecules.

The carbonized resins of this invention are suitable for use as electrodes in electrochemical systems, such as in chlorine cells; in molten aluminum systems; in electroplating systems; in direct electrical generating systems using strong electrolytic acids such as sulfuric and phosphoric acids together with methane and air, hydrogen and oxygen or chlorine, etc. as fuels; as Barnes capture devices or control rods in nuclear reactors; in aerospace systems; as support or walls in catalytic systems; as metallurgical crucibles; diffusion sheets or plates in diffusion devices; as zone refining units, etc.

The production of formed shapes from the Novolac-resol co-reacted compositions of this invention is achieved by well known techniques, such as by compression, injection, transfer and impulse molding. In each case, the resin mixture is introduced into a hot mold under pressure at least sufficient to force the mixture to fill all parts of the mold, and the resin mixture is cured to an insoluble, infusible state.

The temperature used will vary over a wide range, depending on the composition of the Novolac and the composition of the co-reacted resol, the presence or absence of added furfural as either an external crosslinking agent or a reactive plasticizer, the amount and type of carbonaceous fillers and other non-gassing fillers, etc. However, most of these compositions can be molded in the range of 100° to 166° C. (212° to 330° F.) but in some cases temperatures as 180° C. (356° F.) may be used. The preferred range is 149°–166° C. (300°–330° F.).

The same factors recited above as effecting the molding temperatures used as well as the temperature itself, in many cases also affect the choice of pressure used in molding to a shaped form. However, a higher pressure is required to mold a blend containing 60% graphite filler than for one containing 40% or 20% or 0% graphite.

Moreover, the shape of the molded part will also influence the selection of a suitable molding pressure which may require one pressure for compression molding and a higher pressure for transfer molding, and a still higher pressure for injection molding which can be at 20 tons per square inch for transfer and 5 tons per square inch for compression molding. The general range of pressures lies between 0.25 to 25 tons per square inch, and the preferred ranges are 0.25–20 tons per square inch and 0.4–5 tons per square inch for compression molding.

Extractability tests on the molded products of this invention show that there is less than 2 percent and generally less than one percent of material extracted by acetone based on the resin content of the product provided there is no non-reactive additive present, such as a plasticizer. In fact, in most cases the molded product has very little extractible material even when strong solvents, such as dimethylformamide, are used. The extractability tests are performed according to ASTM Procedure D494-46.

The weight ratio of the respective Novolac and resol resins prior to co-reaction, as well as the presence or absence of various additives or modifiers such as external curing agents, e.g., hexa, reactive plasticizers such as furfural, processing aids such as molding plasticizers, e.g., zinc stearate or stearyl alcohol and various types of fillers such as graphite, etc., will depend on the application for which the vitreous carbon is to be utilized. As discussed herein, the applications for the products of this invention are extremely diversified, such as for chemically resisting piping and equipment, and walls and electrodes for fuel cells, etc.

For most applications, the PFUN:PFR ratio can be from 80:20 to 20:80. An amine, such as hexa, is added as described above in an amount equivalent to 1–15%, preferably 2–10% of hexa based on the total amount of phenolic component, or 0.5–6%, preferably 1–5% based on the total weight of resin. As indicated, equivalent amounts of various other amines may be used in place of the hexa. Also 0–5 parts by weight of furfural per 100 parts by weight of resin may be added to aid in plasticity.

Mold lubricants may be incorporated in the resins. Suitable lubricants include fatty acids of 14–22 carbon atoms, their esters of alcohols containing 1–22 carbon atoms and their metal salts, such as Ca, Zn and Mg salts. Typical of these which may be used are oleic acid, stearic acid, Montan wax, stearyl stearate, glyceryl monoleate, glyceryl monostearate, the commercial wax sold under the brand name "Acrawax", zinc, calcium and magnesium stearates, etc. For biomedical applications, the lubricants should be free of metals and metallic compounds. The lubricants may be used in proportions of 0.5–3 percent by weight based on total resin composition.

A very useful class of fillers comprises carbonaceous fillers for which vitreous carbon itself exhibits high adhesion. Such materials include pyrolytic graphite; the normal graphites such as that formed of flat, parallel lamellae of carbon held together by van de Waal's forces (distance approximately 3.35 °A); carbonized celluloses, etc. For economic reasons, the regular graphites generally find greater use in vitreous carbon than the other fillers.

In general, with regular graphite as a reference, the proportion of such fillers in ready-to-use molding powders of this invention may be as little as 5% to produce a noticeable effect, but is advantageously between 35 and 65%, preferably about 40–60% by weight of the molding composition. By adjusting the amount of Novolac in the mixture together with the use of hexa, lubricants, furfural, etc., the proportions of graphite may be adjusted to 30 to 76% of the molding composition. However, the compatibility of the graphite may be improved by the use of finer grades of graphite as compared to more coarse grades. In some cases, it is desirable to use a combination of varying fineness or coarseness in the graphite. The use of varying fineness in the particle size of the graphic enhances the compactness and density of the mixture. For example, in a preferred mixture, the maximum particle size preferably does not exceed 300 microns with some particles being in the 60 to 160 micron range and some particles being less than 60 microns in size. Similar considerations apply to the other carbonaceous fillers.

The amount of carbonaceous filler can also be expressed as parts per 100 parts of the weight of resin. Thus the moldable compositions of this invention comprise a heat curable, pressure moldable blend of 80-20 parts by weight of the Novolac and 20-80 parts by weight of the resol before co-reaction with the combined weight of Novolac and resol totaling 100 parts by weight, plus 0-230, preferably 0-150 parts by weight of a carbonaceous filler, 0-5 parts by weight of furfuraldehyde, 0.5-6 parts by weight, preferably 1 to 5 parts by weight of hexa, and 0-3 parts by weight of mold lubricant, with the proportion of each of the additives being based on 100 parts by weight of the combined Novolac and resol. With extreme dispersion methods such as ball-milling carefully to extremely fine particle size, the amount of graphite may exceed somewhat the amount defined above.

A typical graphite composition may be comprised as follows: 60% graphite, 22.1% phenol-formaldehyde resol co-reacted with 13.0% phenol-furfural Novolac, 1.48% hexa, 0.6% stearyl stearate, 1.25% zinc stearate and 1.25% furfural. Another typical composition may comprise: 40% grpahite, 34.75% phenol-formaldehyde resol co-reacted with 20.17% phenol-furfural Novolac, 0.1% stearyl stearate, 1% zinc stearate and 0.6% furfural. The percentages are percent by weight based on the total composition.

Another typical graphite composition containing 49.9% by weight of graphite, 29.2% PFR co-reacted with 16.6% PFUN, 1.9% hexa, 0.4% stearyl stearate, 1.0% zinc stearate and 1.0% furfural, after being transfer molded as described herein, is ground and tested for acetone soluble content. An average of these tests show 0.48% soluble material which analyzes to show a mixture of stearate plasticizer and unreacted furfural.

In special applications, finely dispersed pyrolytic graphite may be preferred as a filler over normal graphite because of its anistropic properties which appear to enforce the vitreous carbon with its unique thermal and mechanical properties. Pyrolytic graphite is pure crystalline graphite deposited from carbon-bearing vapor at temperatures in excess of 2000° C.

When pyrolytic graphite is used as a filler in the compositions of this invention, it appears that vitreous carbon has increased regions of graphite (or diamond) crystallinity which are dispersed among the small stacks of graphite-like layers. The reason for this is not clear, but it is probably due to a nucleating effect. To some measure, this allows some variability in the ratio of the small stacks of graphite-like layers interspersed with the regions of graphite crystallinity.

The co-reacted blends of this invention are converted to vitreous carbon by the intermediate steps of molding and curing the shaped form. Adequate cure, and therefore curing temperature and time, are of paramount importance since undercured articles usually crack during the carbonization process. The extent of cure may be checked by determining the amount of acetone extractable material. Satisfactory products are obtained when the acetone extractable value is no greater than 2 percent, preferably less than 1 percent, as determined by ASTM Method D494-46 based on the weight of resin content.

Many methods of molding may be used. As previously indicated, the formed precursor part may be compression, transfer, extrusion or injection molded. High production volumes are readily obtained with the blends of this invention by transfer and injection molding in a multicavity mold. In some cases, shaped precursor parts can be machined from other molded or extruded shapes.

In a typical operation, the ground molding composition is first preformed to eliminate trapped air and is electrically preheated to 230° F. (110° C.). This preform is then molded in a molding press using a 5.5" diameter ram operated at 500 psi line pressure. The parts may be cured at 300° F. (149° C.) for 4-5 minutes with a cavity pressure of approximately 1500 psi. Obviously, various other techniques may be used.

The precursor-shaped article is converted to a shaped vitreous carbon article by closely controlled thermal carbonization of the article in an inert atmosphere in a furnace until the maximum heat treating temperature is reached. Then the vitreous carbon article is cooled in the closed furnace and in the inert atmosphere. Usually large numbers of precursor moldings are treated in a single heating operation while retained in graphite containers in the furnace.

In most cases the optimum firing cycle of time versus temperature is determined experimentally for each different shape since the geometry, particularly the wall thicknesses, of the molded part has a direct bearing on the rate. Also the time-temperature relationship is dependent on the degradation characteristics of the final cured resin. The variations in firing cycles will be even greater if the articles have different wall dimensions.

A typical firing cycle generally has a continually increasing temperature and usually has variable rates of increase in different parts of the cycle. During the firing, a substantial volume shrinkage of the article occurs, which is usually in the range of 15 to 25% in those moldings which contain no carbonaceous or other filler. The amount of shrinking depends on the resin, the molding technique and conditions, and the firing cycle. These shrinkages are reproducible and sufficiently predictable to permit manufacturing tolerances of ±0.005 inch.

During the firing of such unfilled molded parts, about 30-35% by weight of the part is lost as volatile gas. When carbonaceous fillers are used with the resin mixture, the shrinkage and weight loss is reduced in proportion to the filler content. To flush out the large amount of gas generated during the vitreous carbon formation, a stream of inert purge gas such as nitrogen, helium or argon is used, or alternatively, a reduced pressure of $10^{-2}$ torr or less may be applied. The outgassing is predominant in certain temperature ranges. For example, from room temperature up to 500°-700° F. (260°-371° C.), the temperature increase is typically at a rate of 1°-5° F. per hour. Above 700° F. (371° C.), the temperature can be increased much more rapidly, as from 10° to 50° F. per hour. Generally for most parts, the temperature above 700° F. (371° C.) is increased at a rate of 10° F. per hour up to 800°-850° F. (427°-455° C.), and thereafter at 20°-50° F. per hour to the maximum temperature which generally need not be above 1800° F. (982° C.). In some cases the maximum temperature need not be above 1000° F. (538° C.). Where high thermal stability is required in the shaped vitreous carbon product, the heating may be continued up to at least 2000° F. (1093° C.) and in some cases, up to at least 3000° F. (1649° C.) and held at that temperature for at least 24 hours. Then the temperature is dropped gradually at a rate of 10°–20° F. per hour.

Sometimes heating up to temperatures of about 300°–900° F. (149°–482° C.) is referred to as "carbonization" and heating to temperatures above about 2100° F. (1149° C.) is sometimes referred to as "graphitization", heating in both cases being done gradually as illustrated above.

Where desired, the critical temperature regimes can be determined by thermogravimetric (TGA) and differential thermal analysis (DTA). The thermal regimes thus determined are characteristics of the chemistry and thermal history of the molded phenolic resin part.

When the Novolac-resol co-reacted resin of this invention is to be molded for purposes other than conversion to vitreous carbon, various fillers other than the carbonaceous fillers recited above may be used such as wood flour, asbestos, lime, calcium carbonate, MgO, glass fibers, etc., and any combination of these or other known modifiers may be used in preparing molding compositions. The methods described above may be used for preparing blends or mixtures for molding purposes.

Accordingly it has been found that the co-reacted Novolac and resol resins prepared as described above may be used for preparing molding compositions for purposes other than the production of vitreous compositions and that such molded products have various improved properties by virtue of the stress-free interaction of the Novolak and resol resins. In such cases the proportions of fillers and additives correspond substantially to those reported above for use in the compositions to be converted to vitreous carbon.

In the addition of preformed Novolac to a solution of the resol prior to initial or substantially complete dehydration of the resol, the preformed Novolak may be completely dehydrated or partially dehydrated, advantageously at least 25 percent of the water initially present, preferably at least 50 percent of this water is removed prior to addition to the resol. The product obtained after dehydration of the mixture is completed is a grafted polymerization product.

The resin of this invention is prepared by adding preformed phenolic furfuraldehyde Novolak, preferably phenol-furfuraldehyde Novolac, to an aqueous solution or suspension of a phenolic-aldehyde resol, preferably phenol-formaldehyde resol, prior to the dehydration of the resol resin. The Novolac may be completely dehydrated or partially dehydrated at the time of its addition to the resol. At the time of the addition, the resol may be partially dehydrated but the addition is preferably made before initiation of the dehydration.

As described above in the comments made regarding FIG. 1, the product obtained by this procedure is a graft polymerization product of improved physical properties. This is particularly true with regard to the properties of the vitreous carbon produced therefrom. These new products are a decided improvement over those produced according to other methods. This improvement not only affects favorably the physical properties of the vitreous carbon plates, but practically eliminates rejects of these plates on the basis of permeability. In the FIG. 1 compositions the Novolak is PFUN produced by the procedure of Example I given below, and the resol is PFR produced by the procedure of Example III, the graft polymerization product is produced according to Example V. In both cases, the proportions are 35 parts PFUN to 65 parts PFR and identical amounts of filler and modifiers are used. It has also been found possible in accordance with the present invention to make thin vitreous carbon plates as large as 50"×50"×0.045".

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Preparation of Phenol-Furfuraldehyde Novolac (PFUN)

Into a 4 liter resin vessel equipped with a mechanical stirrer, distillation condenser, heating mantel and thermometer is placed 2000 gms (21.28 moles) of USP phenol and 1480 gms (15.25 moles) of furfural. This mixture is heated to 66° C. and 30.0 gms (0.36 mole) sodium carbonate added. The charge is then slowly heated to 121° C. at which temperature the heating mantel is removed. The reaction then becomes exothermic and the temperature continues to rise until boiling begins at 135° C. The distillate is collected in a separating device and the furfural layer is periodically drawn off and returned to the batch during the course of the reaction. Distillation is continued for 3 hours, 40 minutes with the batch temperature maintained between 133° and 139° C. The resin is then discharged from the vessel and allowed to cool to a solid which has a melting point of 89° C. (192° F.), a yield of 3230 gms, a glass transition temperature of 330° K. (134.6° F.). This is a non-curing Novolac resin, as shown when tested on a hot plate at 330° F., but when thoroughly mixed with 10 pph of hexa, has a set time at 330° F. of 65–69 sec.

EXAMPLE II

The procedure of Example I is repeated except that midway in the distillation, 30 gms of glycerylmonooleate is added, thoroughly mixed and the distillation continued. The resin has a melting point of 85.5° C. (186° F.), a glass transition temperature of 327° K. This is also a non-curing Novolac resin and with 10 pph of hexa, has a set time of 67–68 sec.

EXAMPLE III

Preparation of Phenol-Formaldehyde Resol Resin (PFR)

(a) Into equipment as used in Example I there is placed 1500 gms (15.96 moles) of USP phenol, 1197 gms (20.75 moles) of aqueous formaldehyde (52%), 23 gms (0.16 mole) of hexa, and 7 gms (0.170 mole) of sodium hydroxide (97%). This mixture is warmed to 90° C. and maitained at this temperature for one hour. At the end of this period the reflux condenser is replaced with a vacuum distillation condenser and receiver. The batch is then maintained at a vacuum of 26" of Hg and heat supplied until the batch temperature reaches 90° C. (194° F.). Then the vacuum is adjusted to 28" Hg and distillation continued for one hour. The reaction is then terminated and the product discharged from the vessel. The amount of distillate water collected is 940 gms. The product weighs 1855 gms and has a gradient bar melting point of 79.5° C. (175° F.), a glass transition temperature as measured by differential scanning calorimetry of 321° K. (118.4° F.) and a hot plate set time of 17–18 seconds at 330° F. (165.5° C.).

(b) The above procedure is repeated using 36.3 gms of 30% aqueous ammonia, (0.64 mole or 10.88 gms $NH_3$) but omitting the hexa. A specimen of the product indicates that the melting point is about 175° F. (79.5° C.) and is similarly grindable as the resol produced in (a).

(c) The procedure of Example III(a) is repeated except that 1058 gms (18.34 moles) of the aqueous formaldehyde solution is used. The product is a grindable resol.

(d) The procedure of Example III(a) is repeated using 1335 gms (23.15 moles) instead of the 1197 gms of the aqueous formaldehyde. The product is a grindable resol.

EXAMPLE IV

Preparation of Phenol-Formaldehyde Novolac Resin (PFN)

Into a 4 liter resin flask equipped with a mechanical stirrer, reflux condenser and thermometer is placed 2000 gms (21.28 moles) USP phenol; 882 gms (15.28 moles) aqueous formaldehyde (52%); 200 gms water and 12 gms (0.10 mole) phosphoric acid (85%). The pH of the resulting mixture is 1.05. This mixture is then heated to reflux and refluxed a total of 5 hours. The free formaldehyde content of the mixture at this point is found to be 0.84%. At this point, the reflux condenser is replaced with a distillation condenser and batch distilled under atmospheric pressure for one hour until the batch temperature reaches 160° C. At this point a mixture of 173 gms (3.0 moles) of 51% aqueous formaldehyde mixed with 70 gms of water is slowly added to the mixture over a period of 36 minutes. During the addition, the batch temperature drops to 142° C. When all the aqueous formaldehyde has been added, the batch is held at 142°–150° C. for 15 minutes. Then the receiver on the distillation condenser is replaced with a vacuum receiver to allow completion of the batch under vacuum. The resin is then dehydrated to a batch temperature of 165° C. under vacuum of 28 inches of mercury. The vacuum is released and the resin discharged from the vessel to yield 2027 gms of product, which exhibits a gradient bar melting point of 223° F. and a glass transition temperature as measured by differential scanning calorimetry of 70° C. (158° F.). This resin is a non-curing Novolac as shown when tested on a hot plate at 330° F. However, when thoroughly bended with 10 parts per hundred (pph) of hexa, it has a set time of 24–25 sec. when heated at 300° F. (166° C.).

EXAMPLE V

Preparation of a Polyhydroxymethylphenol Grafted Phenol-Furfural Novolac-Ratio of Grafting Resol to Phenol-Furfural Novolac=90/10

Into a 4 liter resin flask equipped with a 4-necked top bearing a thermometer, reflux condenser, mechanical stirrer and stopper is placed 1712 grams (18.21 moles) phenol, 1199 grams (20.78 moles) formaldehyde (52%). This mixture is cooled to 39° C. at which point 8.0 grams (0.2 moles) sodium hydroxide and 85.6 grams (0.61 moles) hexamethylenetetramine are added. This mixture is heated to 90° C. over a period of 30 minutes and held at 90° C. for 30 minutes. The reflux condenser is then replaced with a vacuum distillation apparatus and the batch cooled rapidly by vacuum distillation at 26" of vacuum, to a temperature of 63° C. With a heating mantel variable resistor set at 56, 250 grams of phenol-furfural Novolac (from Example I), which has been fine ground to pass through a 60-mesh screen is added. The total addition time is 2 minutes. During the addition, the temperature is allowed to rise slowly to 64° C. When the addition is complete, the vessel is closed and vacuum distillation effected at 26" of mercury vacuum to a temperature of 92° C. At this point a continuous reading watt meter attached to the drive motor reads 110 watts at a speed setting of 5. The resin is discharged to a pan to cool. Upon cooling, the resin is found to have a melting point of 84° C. by the gradient bar method and a set time of 30.5 seconds at 165° C. by the stroke cure method. The yield of graft copolymer is 2459 grams.

The product of the above reaction is then ground to pass through a 60-mesh screen and placed on a differential two-roll compounding mill, the front roll of which is maintained at 121° C. and the back roll at 27° C. This resin is then melted and compounded without additives for a total of 17 minutes to give a product having a Brabender minimum torque and duration of 2700 meter-grams and 40.5 seconds, respectively. This Brabender measurement is performed on a standard Brabender plasticorder equipped with a half size head and roller blades. The temperature of the measurement is 125° C. at 60 rpm with a connector setting of 1.5, a sensitivity of 45(X5) with no suppression of torque.

The product is then molded in a standard transfer press using 600 psi of line pressure to yield standard ASTM compressive strength, tensile strength, flexural strength, Izod impact strength, and dielectric strength specimens. These moldings are then tested with the following results:

Specific Gravity—1.28
Compressive Strength, psi—32,040
Flexural Strength, psi—14,366
Izod Impact Strength, ft-lb/in.—0.24 (notched)
Tensile Strength, psi—7,420
Dielectric Strength, v/mil—272
Deflection Temperature at 264 psi—367° F. (186° C.)

As illustrated in Example V, the Novolac is advantageously added after refluxing and preferably when sufficient removal of water has been performed under vacuum to effect a desired amount of cooling, advantageously 55°–70° F. If desired, the cooling may be effected by other means and the Novolac added after refluxing and before water removal is initiated. Water removal is effected, in either case, after the Novolac is added.

EXAMPLE VI

Preparation of a Polhydroxymethylphenol Grafted Phenol-Furfural Novolac. Ratio of Grafting Resol to Phenol-Furfural Novolac=80/20

The procedure of Example V is repeated using 1522 grams (16.19 moles) of phenol, 1066 grams (18.48 moles) of formaldehyde (52% solution), 7.10 grams (0.178 moles) of sodium hydroxide, 76.1 grams (0.54 mole) of hexamethylenetetramine, and 250 grams of the phenol-furfural Novolac of Example I. The addition time is 3 minutes and the temperature is allowed to rise slowly to 81° C. Vacuum distillation is effected at 24.8 inches of mercury vacuum to a temperature of 93° C. The watt meter reading is 120 watts at a speed setting of 5. The recovered resin has a melting point of 183.8° C. and a set time of 30.5 seconds at 165° C. The yield of graft copolymer is 2468 grams. Compounding is effected for 21 minutes to a Brabender minimum torque and duration of 2200 metergrams and 73.5 seconds, respectively. The results from the tests of the moldings are:
- Specific Gravity—1.28
- Compressive Strength, psi—30,380
- Flexural Strength, psi—12,544
- Izod Impact Strength, ft.-lb./in.—0.24 (notched)
- Tensile Strength, psi—6,700
- Dielectric Strength, v/mil—275
- Deflection Temperature at 264 psi—320° F. (160° C.)

EXAMPLE VII

Preparation of a Polyhydroxymethylphenol Grafted Phenol-Furfural Novolac. Ratio of Grafting Resol to Phenol-Furfural Novolac = 70/30

The procedure of Example V is repeated using 1332 grams (14.17 moles) of phenol, 932 grams (16.15 moles) of formaldehyde (52% solution), 6.20 grams (0.156 moles) of sodium hydroxide, 66.6 grams (0.48 mole) of hexamethylenetetramine, and 750 grams of the phenol-furfural Novolac of Example I. The addition time is 12 minutes and the temperature is allowed to rise slowly to 68° C. Vacuum distillation is effected at 25 inches of mercury vacuum to a temperature of 92° C. The watt meter reading is 120 watts at a speed setting of 5. The recovered resin has a melting point of 82° C. and a set time of 31.5 seconds at 165° C. The yield of graft copolymer is 2480 grams. Compounding is effected for 20 minutes to a Brabender minimum torque and duration of 2000 metergrams and 73.5 seconds, respectively. The results from the tests of the moldings are:
- Specific Gravity—1.28
- Compressive Strength, psi—29,420
- Flexural Strength, psi—9,728
- Izod Impact Strength, ft.-lb./in.—0.24 (notched)
- Tensile Strength, psi—6,187
- Dielectric Strength, v/mil—304
- Deflection Temperature at 264 psi—297° F. (147° C.)

EXAMPLE VIII

Preparation of a Polyhydroxymethylphenol Grafted Phenol-Furfural Novolac. Ratio of Grafting Resol to Phenol-Furfural Novolac = 60/40

The procedure of Example V is repeated using 1142 grams (12.15 moles) of phenol, 799 grams (13.85 moles) of formaldehyde (52% solution), 5.33 grams (0.133 moles) of sodium hydroxide, 57.1 grams (0.41 mole) of hexamethylenetetramine, and 1000 grams of the phenol-furfural Novolac of Example II. The addition time is 5 minutes and the temperature is allowed to rise slowly to 77° C. Vacuum distillation is effected at 24 inches of mercury vacuum to a temperature of 93° C. The watt meter reading is 120 watts at a speed setting of 5. The recovered resin has a melting point of 86° C. and a set time of 28.5 seconds at 165° C. The yield of graft copolymer is 2488 grams. Compounding is effected for 19.5 minutes to a Brabender minimum torque and duration of 2200 metergrams and 45 seconds, respectively. The results from the tests of the moldings are:
- Specific Gravity—1.2
- Compressive Strength, psi—26,780
- Flexural Strength, psi—12,351
- Izod Impact Strength, ft.-lb./in.—0.24 (notched)
- Tensile Strength, psi—4,736
- Dielectric Strength, v/mil—320
- Deflection Temperature at 264 psi—261° F. (127° C.)

EXAMPLE IX

Preparation of a Polhydroxymethylphenol Grafted Phenol-Furfural Novolac. Ratio of Grafting Resol to Phenol-Furfural Novolac = 50/50

The procedure of Example V is repeated using 1500 grams (15.96 moles) of phenol, 1050 grams (18.2 moles) of formaldehyde (52% solution), 7 grams (0.175 moles) of sodium hydroxide, 75 grams (0.54 mole) of hexamethylenetetramine, and 1933 grams of the phenol-furfural Novolac of Example I. The addition time is 46 minutes and the temperature is allowed to rise slowly to 77° C. Vacuum distillation is effected at 19 inches of mercury vacuum to a temperature of 89° C. The watt meter reading is 90 watts at a speed setting of 5. The recovered resin has a melting point of 84° C. and a set time of 34.5 seconds at 165° C. The yield of graft copolymer is 3904 grams. Compounding is effected for 23 minutes to a Brabender minimum torque and duration of 2400 metergrams and 120 seconds, respectively. The results from the tests of the moldings are:
- Specific Gravity—1.28
- Compressive Strength, psi—25,860
- Flexural Strength, psi—10,944
- Izod Impact Strength, ft.-lb./in.—0.26 (notched)
- Tensile Strength, psi—7,640
- Dielectric Strength, v/mil—280
- Deflection Temperature at 264 psi—228° F. (108° C.)

EXAMPLE X

Preparation of a Polhydroxymethylphenol Grated Phenol-Furfural Novolac. Ratio of Grafting Resol to Phenol-Furfural Novolac = 30/70

The procedure of Example V is repeated using 571 grams (6.08 moles) of phenol, 399 grams (6.93 moles) of formaldehyde (52% solution), 2.66 grams (0.066 moles) of sodium hydroxide, 28.54 grams (0.204 mole) of hexamethylenetetramine, and 1750 grams of the phenol-furfural Novolac of Example II. The addition time is 22 minutes and the temperature is allowed to drop slowly to 66° C. Vacuum distillation is effected at 24 inches of mercury vacuum to a temperature of 90° C. The watt meter reading is 100 watts at a speed setting of 4.5 The recovered resin has a melting point of 87° C. and a set time of 41.5 seconds at 165° C. The yield of graft copolymer is 2497 grams. Compounding is effected for 37 minutes to a Brabender minimum torque and duration of 1900 metergrams and 105 seconds, respectively. The results from the tests of the moldings are:
- Specific Gravity—1.28
- Compressive Strength, psi—17,380
- Flexural Strength, psi—6,528
- Izod Impact Strength, ft.-lb./in.—0.25 (notched)
- Tensile Strength, psi—3,093
- Dielectric Strength, v/mil—285
- Deflection Temperature at 264 psi—187° F. (86° C.)

EXAMPLE XI

Preparation of a Polhydroxymethylphenol Grafted Phenol-Furfural Novolac. Ratio of Grafting Resol to Phenol-Furfural Novolac=20/80

The procedure of Example V is repeated using 380.5 grams (4.05 moles) of phenol, 266.4 grams (4.62 moles) of formaldehyde (52% solution), 1.78 grams (0.045 moles) of sodium hydroxide, 19.03 grams (0.136 mole) of hexamethylenetetramine, and 2000 grams of the phenol-furfural Novolac of Example I. The addition time is 30 minutes and the temperature is allowed to drop slowly to 78° C. Vacuum distillation is effected at 19 inches of mercury vacuum to a temperature of 80° C. The watt meter reading is 150 watts at a speed setting of 4. The recovered resin has a melting point of 110° C. and a set time of 33.5 seconds at 165° C. The yield of graft copolymer is 2795 grams. Compounding is effected for 5.5 minutes to a Brabender minimum torque and duration of 2500 metergrams and 52.5 seconds, respectively. The results from the tests of the moldings are:

Specific Gravity—1.28
Compressive Strength, psi—27,840
Flexural Strength, psi—9,024
Izod Impact Strength, ft.-lb./in.—0.24 (notched)
Tensile Strength, psi—4,580
Dielectric Strength, v/mil—253
Deflection Temperature at 264 psi—334° F. (168° C.)

EXAMPLE XII

Demonstration of the Formation of a Graphite-Filled Composition

The resins from Examples I and IIIa are independently ground to pass through a 0.05" screen and blended as follows:

Resin from Example I (PFUN)—850 grams
Resin from Example IIIa (PFR)—1500 grams
Powdered Graphite—2560 grams
Powdered Hexamethylenetetramine—100 grams
Stearyl Stearate—20 grams
Furfural—50 grams
Stearic Acid—50 grams After blending for one hour in a ribbon blender, this mixture is compounded on a two-roll differential mill with the front roll maintained at 200° F. (93° C.) and the back roll at 300° F. (149° C.). The mill time is 15 seconds after complete melting of the resin. The sheet is then stripped from the roll, cooled and ground to a particle size of 6–80 mesh as measured on U.S. Standard Sieves. This powder is measured for plasticity and curing characteristics on the Brabender plasticorder described in Example V and is found to have a minimum plasticity of 500 metergrams and a flow duration of 285 seconds at 125° C. This material is then molded by transfer molding to sheets 22.5"×27.5"×0.045" thickness. Ordinary transfer molding is not reproducibly successful with this material because of insufficient flow duration. However, it can be molded successfully and reproducibly using compression molding techniques with 868 grams of 2" preforms weighing 62 grams each, on a large 600 ton compression press. The cavity pressure in this molding in 1500 psig and the plates are molded at 300° F. (149° C.) for 3–4 minutes. These plates are successfully converted to graphite filled vitreous carbon of acceptable properties by the method described below in Example XIV.

EXAMPLE XIII

Demonstration of Resole Grafted Novolac Resin Blended with Graphite and Other Additives The resin from Example VII is ground to pass through a 0.05" screen and blended with the following ingredients:

Resin from Example VII—2350 grams
Powdered Graphite—2560 grams
Powdered Hexamethylenetetramine—100 grams
Stearyl Stearate—20 grams
Furfural—50 grams
Stearic Acid—50 grams After blending for one hour in a ribbon blender, this mixture is compounded on a two-roll differential mill with the front roll maintained at 200° F. (93° C.) and the back roll at 300° F. (149° C.). The mill time is 15 seconds after complete melting of the resin. The sheet is then stripped from the roll, cooled and ground to a particle size of 6–80 mesh as measured on U.S. Standard Sieves. This powder is measured for plasticity characteristics on the Brabender plasticorder described in Example XIX and is found to have a minimum plasticity (low torque) of 400 metergrams and a flow duration of 435 seconds at 125° C. Conventional mixtures of single-stage and two-stage resins blended with identical types and amounts of fillers in a identical formula and compounded identically, give Brabender values of 500 metergrams and 285 seconds flow duration. This demonstrates the desirable and unexpected features of these resins of increased flow duration and fluidity. These are features which allow this material to fill complex molds before gelation occurs thereby allowing curing to take place under high pressure to give dense void free parts. Because of the demonstrated improvements in flow behavior and physical homogeneity it is believed that the grafted Novolac of this invention is superior to mixtures of similar resins. This is molded according to the transfer molding method into sheets 22.5"×27.5"×0.045" thickness. Alternatively, the sheets can also be molded into similar plates using compression molding techniques with 868 grams of 2" preforms weighing 62 grams each on a large 600 ton compression press. The cavity pressure in this molding is 1500 psig and the plates are molded at 300° F. (149° C.) for 3–4 minutes. These plates are successfully converted to graphite filled vitreous carbon of excellent properties by the method described below in Example XIV.

EXAMPLE XIV

Carbonization of the Moldings of Examples XII and XIII

To evaluate the carbonizability of these materials, the plates from Examples XII and XIII are placed in a graphite container in a furnace having a nitrogen atmosphere. The carbonization cycle used is that described by Thornbury and Morgan (Soc. Plast. Eng. PACTEC 1975, Sept. 16–18, 1975, p. 47). The temperature in the furnace is raised gradually at a rate about 2°–3° F. per hour to a temperature of 700° F. (371° C.) at which point the temperature increase rate is adjusted to about 10° F. per hour up to 800°–850° F. (427°–454° C.) and, thereafter, at a rate of about 30° F. per hour to 1800° F. (982° C.) which temperature is maintained for about 25 hours. Then while the nitrogen temperature is maintained in the closed furnace, the temperature is decreased gradually at a rate of about 10°–20° F. per hour to room temperature. Impermeable plates of vitreous carbon of excellent quality are obtained in each case.

EXAMPLE XV

The procedure of Example XIV is repeated a number of times with similar results using respectively the co-reacted resins of Examples VI, VIII and IX (which have PFR/PFUN ratios of 80/20; 60/40 and 50/50 respectively), each of which resins is mixed with graphite according to the procedure of Example XIII.

EXAMPLE XVI

The procedures of Examples I, V, XIII and XIV are repeated a number of times with satisfactory results in producing vitreous carbon using:

(a) An equivalent amount of meta-cresol in place of the phenol in preparing the Novolac and the resol and these are used in the procedure of Example V;

(b) An equivalent amount of p,p'-diphenylolmethane is used in place of phenol in preparing the Novolac used in the procedure of Example V;

(c) An equivalent amount of beta-naphthol is used in place of phenol in preparing the resol used with the PFUN in the procedure of Example V.

In order to show the difference between the use of a phenol-formaldehyde Novolac and a phenol-furfuraldehyde Novolac as used in the practice of this invention, the following Example XVII describes experiments testing the addition of a phenol-formaldehyde Novolac (PFN) to a series of phenol-formaldehyde resols (PFR) prior to dehydration of the resol. These experiments are performed on a series of mixtures in which the weight ratio of resol to Novolac or PFR/PFN ranges from 40/60 to 80/20. The PFN is prepared by the procedure described in example IV. In the preparations according to this invention, The dehydration is conducted under vacuum until the wattage being applied to the agitator or stirrer reaches a value correlated to the approximate melting point desired in the resin product. As shown in Example V, this requires a watt reading of 110 for an agitator motor speed setting of 5. Completion of reaction may also be indicated by the amount of distillate water collected, the calculation being based on the amount of water added in the formaldehyde solution plus that freed by reaction of the CH2O with the phenol. The distillate is primarily water with 2% by weight of free formaldehyde and 5% by weight of free phenol. In the reactions reported below in Example XVII, neither of these measures indicated a completion of reaction prior to the gellation which occurred in each case. Moreover, resols prepared by standard procedures are not grindable and require the presence of hexa or ammonia as shown in Example III a, b, c and d to give grindable character to the resol. In a number of the runs of Example XVII where no hexa is used, the product is a rubbery gel. In an attempt to produce a grindable resin, hexa is used in Run C but this results in a much quicker gellation than is produced in Runs A, B and D.

EXAMPLE XVII

Attempted Preparation of PFR-PFN Grafted Resins

Four experiments are performed in a 4000 ml resin flask equipped with an agitator, thermometer and reflux condenser connected to a distillate collector, plus a watt measuring device adapted to read the wattage supplied to the agitator motor. In this flask there are placed appropriate amounts of USP phenol, formaldehyde (as a 52% aqueous solution) and NaOH as a catalyst. In each case the mixture of phenol and aqueous formaldehyde is cooled to 40° C. and the NAOH is added. The temperature is then raised to 90° C. and held at this temperature for about ½ hour. Then the equipment is adapted for vacuum distillation and the phenol-formaldehyde Novolak (PFN) is added in the form of a fine powder. A vacuum of about 26 inches of mercury is applied but completion of reaction is never reached as would be indicated by the wattage reading or by the amount of distillate water collected. The proportions of reagents, conditions of reaction and results obtained are reported below in Table A.

TABLE A

| Run No. | A | B | C | D |
|---|---|---|---|---|
| Phenol (gms) | 761 | 1142 | 1500 | 1522 |
| Phenol (moles) | 8.10 | 12.15 | 15.96 | 16.19 |
| Formaldehyde (52%): Aqueous solution (gms) | 533 | 799 | 1381 | 1066 |
| CH2O (gms) | 277.16 | 415.48 | 718.64 | 554.32 |
| CH2O (moles) | 17.77 | 13.85 | 23.94 | 18.48 |
| Phenol/CH2O (mol. ratio) | 1/2.19 | 1/1.14 | 1/1.50 | 1/1.14 |
| NaOH (gms) | 3.55 | 5.33 | 7 | 7.1 |
| Hexa (gms) | — | — | 105 | — |
| PFN (gms) | 1500 | 1000 | 1333 | 500 |
| Ratio (Resol/Novolak) | 40/60 | 60/40 | 70/30 | 80/20 |
| Vacuum (inches Hg.) | 26–28 | 26–28 | 26 | 26 |
| Temp. (°C.) | 9–95° C. | 90–95° C. | 90° C. | 90–94° C. |
| Result | Gelled | Rubbery Gel | Gelled | Rubbery Gel |
| *Time before gellation | 6 hrs. 15" | 5 hrs. 56" | 13 min. | 6 hrs. 23" |
| Watts at motor speed setting of 5 | 50 | 70** | — | — |
| Distillate collected (gms) | 380 | — | — | 726 |
| Percent of theoretical water | 58.7% | — | — | 49% |

*After the addition of PFN is completed and vacuum is applied.
**With motor speed setting of 7.

The process of this invention is much simpler and gives better reproducibility than obtained with mixtures of resins as described in application Ser. No. 50,531.

Where reference is made to phenol-furfural Novolacs, it is intended that this includes Novolaks in which other aldehydes may be used to replace a minor amount of furfuraldehyde in the formation of the resin. Thus in referring to a phenol-furfural Novolac, it is intended to include Novolacs in which the major molar amount of the aldehyde used to condense with the phenol is furfural. In other words, while 100 molar percent of furfural is preferred for this purpose, it is found that so long as at least 50 molar percent of the condensing aldehyde is furfural, the resulting Novolac gives satisfactory results for the purpose of this invention.

Where there is poor plasticity during molding, it is generally necessary to use higher pressures. As indicated in the above examples, pressures of 1500 psi are used satisfactorily with PFUN-coreacted-PFR-graphite mixtures and, in most cases, the molding plasticity may be sufficiently improved to permit lower pressures, preferably 800–1500 psi. Pressures above 1500 psi and more particularly above 2000 psi may cause stresses and strains in the molded products and in the vitreous carbon produced therefrom. These stresses and strains very often cause cracks and particularly microcracks in the products. These stresses and the accompanying cracks and microcracks are avoided or at least reduced by the lower molding pressures allowed by the improved molding plasticity of the coreacted PFUN-PFR combinations of this invention.

As pointed out above, the co-reacted product of the phenol-furfuraldehyde Novolac with the resol has a molding plasticity which allows the viscous mass to flow uniformly and readily to completely fill the mold. This is particularly evident when the resin is filled with a substantial amount of filler such as graphite. This improved plasticity has made it possible to mold and convert to vitreous carbon PFUN-coreacted-PFR-graphite filled plates as large as 50"×50" and having a thickness of 0.04-0.05 inch and having excellent resistance to permeability and freedom from cracks and pits. PFN-PFR-graphite filled mixtures do not have satisfactory plasticity and flow for this purpose. The preferred ratios of PFUN/PFR run from 20/80 to 50/50.

The vitreous carbon made from the co-reacted products described above are very much improved in freedom from pits and holes. This improvement with respect to freedom from pits and holes and cracks in the vitreous carbon products of this invention is evidenced by improved resistance to permeability and also in the reduction in the number of rejects when the vitreous carbon products, such as large thin plate, are subjected to various tests to determine whether they will meet the conditions in which they will be exposed for use in fuel cells.

In parent applications the examiner has cited Rice et al U.S. Pat. No. 3,998,906 and Japanese Patent No. 53-75294. Both of these patents are directed to the preparation of resins used for binding and particles for making molds for metal casting. Neither of these references teaches the unexpected superiority of a phenol-furfural Novolac resin in such mixtures as taught herein, nor does either reference teach the advantage of adding an amine, such as hexamethylenetetramine to the resol prior to the addition of the Novolac.

The following examples demonstrate the inferiority of phenol-formaldehyde Novolacs (PFN) mixtures compared to the phenol-furfural Novolacs (PFUN) mixtures shown in Examples I, II and VI-XIV for the purposes of this invention. These examples also illustrate the importance of adding hexa to the resol-Novolac reaction mixture to prevent gelation and to give improved molding plasticity. For comparative purposes in these examples, the ratio of phenol formaldehyde resole (PFR) to PFN or PFUN is 60/40 since this has been found to be a preferred ratio.

Each of the resins produced in these examples is mixed with graphite according to the procedure of Example XII and molded at 300° F. for 3-4 minutes (using 3-5 specimens of each resin) into plates having dimensions of 22.5 inches×27.5 inches ×0.045 inch using a 600 ton press operating at 2000 psi line pressure. The various plates are inspected carefully for defects and flaws and graded by the following designations: blisters (B); knitlines (KL); hole in center (HC); porosity (P); short corner (SC); slight short corner (SSC); short side (SS) and no visible flaws (NF).

Examples XVII through XXIII demonstrate the use of PFR/PFN combinations in which only a limited amount of hexa is added prior to the grafting operation, the amount being approximately the small amount required only for the resol improvement, with varying amounts of water removed from the Novolac prior to its addition to the resol components. Examples XXIV and XXV demonstrate the use of PFR/PFN combinations in which larger amounts of hexa are added prior to or during the grafting operation with varying amounts of water removed from the Novolac prior to its addition to the resol components. Reference in these examples to "without hexa" means the addition of no more than the limited small amount of hexa for the resol and "with hexa" means the addition of sufficient hexa to act in the grafting operation.

As will be noted, the procedures of these examples do not produce satisfactory plates.

EXAMPLE XVII

This example follows the procedure of Example 3 of Japanese Pat. No. 53-75294. A resol precondensate is prepared by placing in a reactor equipped with a reflux condenser: 940 gms (10 moles) of phenol; 1214 gms of 42% formalin (aqueous solution of formaldehyde) (17 moles); and 47 gms of trisodium phosphate. The mixture is refluxed 1.5 hours. The resulting 2196 gms of precondensate has a resin content of 50% and volatile portion of 50%.

In a separate, similar reactor are placed 940 gms of phenol, 571 gms of 42% formalin and 9.4 gms oxalic acid and this mixture refluxed for 2 hours to give 1518 gms of Novolac resin precondensate.

The entire amount (2196 gms) of the resol precondensate are added to 844 gms of the Novolac precondensate and the resulting mixture is gently reacted under reduced pressure and removing water and unreacted phenol until the temperature reaches 90° C., at which time the reaction mixture gelled and was removed from the reactor and cooled to yield 2896 gms of semi solid gel. The reaction is repeated twice with each batch gelling similarly.

This resin is molded into a plate as described above. The plate is completely unsatisfactory for further processing into vitreous carbon since it has short corners, short sides, knitlines and holes in the center.

EXAMPLE XVIII

The procedure of Example 4 of Japanese Pat. No. 53-75294 is followed. The procedure of Example XVII is repeated and to the 1518 gms of Novolac resin produced there is added 725 gms of the resol resin produced. The mixture is further processed as in Example XVII to yield 1452 gms of solid resin, which by gradient bar melt point melts at 180° F. and exhibits a somewhat rubbery set at 330° F. in 30 sec.

When this resin is molded into a plate as described above, the same unsatisfactory results are obtained as in Example XVII.

EXAMPLE XIX

The procedure of Example 1 of Rice U.S. Pat. No. 3,998,906 is followed. Prepolymer A (a Novolac) is prepared by mixing in a reactor equipped with temperature control means and refluxing facilities 1177 parts of USP phenol, 395 parts of 95% paraformaldehyde (5% water), 1759 parts of water to equate the paraformaldehyde to aqueous formaldehyde and 200 parts of 50% aqueous NaOH solution. The first three ingredients are mixed and a small initial amount of the NaOH solution is added to dissolve the paraformaldehyde. The temperature is raised to 50°-55° C. and the remainder of the NaOH solution is added. Then the temperature is raised to 90° C. and the mixture reacted for 30 minutes, after which the temperature is lowered to 80°-85° C. and reaction continued for 60 minutes. The product is then cooled to room temperature.

Prepolymer B (Resol) is prepared in a similar reactor using 1177 parts of USP phenol, 925 parts of 95% paraformaldehyde, 2177 water and 180 gms of 50% aqueous NaOH solution. The procedure of the preceding paragraph is followed except that the first heating is to 60°–65° C. and after addition of the balance of the NaOH solution, the temperature is lowered to 50°–55° C. and reaction continued for 120 minutes. Then reaction is continued at 45°–50° C. for an additional 60 minutes before the reaction product is cooled to room temperature.

Prepolymer A (938 parts) and prepolymer B (938 parts) are added to a similar reactor together with 33.8 parts of 50% NaOH solution and the temperature raised to 85°–87° C. for a sufficient period that the reaction mixture reaches a viscosity of 600–700 centipoises (measured at 25° C.). Then the reaction temperature is lowered to 75°–80° C., 90.2 parts of 50% aqueous NaOH solution is added and reacted at 75°–80° C. until the resultant resin reaches a viscosity of 400–500 cps (measured at 25° C.) at which time the resin is cooled to room temperature.

Three plates are molded from this resin using the procedure described above. None of these plates are satisfactory, with all three having short corners and porosity and two also having short sides, and either knitlines or holes.

EXAMPLE XX

60/40 PFR/PFN Without Hexa During Grafting (25% Water Removed From PFN)

(a) Into equipment as used in Example I there is placed 2000 gms (21.28 moles) of USP phenol, 822 gms (15.28 moles) of aqueous formaldehyde (52%), 200 gms water and 2 gms (0.10 mole) of phosphoric acid (85%). This mixture is then heated to reflux and refluxed for a total of 5 hours. At this point the reflux condenser is replaced with a distillation condenser and batch distilled until the batch temperature reaches 160° C. Then a mixture of 173 gms (3.0) moles of 51% aqueous formaldehyde mixed with 70 gms of water is slowly added to the mixture over a period of 36 minutes. During the addition the batch temperature drops to 142° C. When all the aqueous formaldehyde has been added, the batch is held at 142°–150° C. for 15 minutes. Then the receiver on the distillation condenser is replaced with a vacuum receiver to allow continuation of water removal. Then the vacuum is adjusted to 28" Hg and distillation continued until 25% of the water is collected (based on the amount of water collected with 100% removal). This PFN product is retained for subsequent use below.

(b) Into a 4-liter resin flask equipped with a 4-necked top bearing a thermometer, reflux condenser, mechanical stirrer and stopper is placed 1142 grams (12.15 moles) USP phenol and 799 grams (13.85 moles) aqueous formaldehyde (52%). This is cooled to 39° C. and there are added 51.7 gms of hexa and 5.33 gms (0.133 moles) of sodium hydroxide. This mixture is heated to 90° C. over a period of 30 minutes and held at 90° C. for 30 minutes. The reflux condenser is then replaced with a vacuum distillation apparatus and the batch cooled rapidly by vacuum distillation at 26" of vacuum, to a temperature of 63° C. With a heating mantel variable resistor set at 56, 2180 gms of the phenol formaldehyde Novolac (PFN) of (a) is added. During the addition, the temperature is allowed to rise slowly to 64° C. When the addition is complete, the vessel is closed and vacuum distillation is effected at 26" of mercury vacuum to a temperature of 92° C. At this point a continuous reading watt meter attached to the drive motor reads 110 watts at a speed setting of 5. The resin is discharged to a pan to cool.

Three specimens are molded into plates as described above. All three plates are defective with each of the three having holes and porosity, two having short sides and one of these two also having short corners.

EXAMPLE XXI

60/40 PFR/PFN Without Hexa During Grafting (50% Water Removed From PFN)

The procedure of Example XX is repeated except that 470 gms (50%) of the water is removed from the Novolac (PFN) prior to its addition to the resol in (b). The resultant resin is likewise molded into five plates, four of which proved to be unsatisfactory, three of them having porosity and the fourth having holes and short corners, two of the three also having short sides and one having short corners.

EXAMPLE XXII

60/40 PFR/PFN Without Hexa During Grafting (75% Water Removed From PFN)

The procedure of Example XX is repeated except that 705 gms (75%) of the water is removed from the Novolac (PFN) prior to its addition to the resol in (b). The resultant resin is likewise molded into a plate which because of short corners and short sides is unsatisfactory.

EXAMPLE XXIII

60/40 PFR/PFN Without Hexa During Grafting (100% Water Removed From PFN)

The procedure of Example XX is repeated except that 940 gms (100%) of the water is removed from the Novolac (PFN) prior to its addition to the resol in (b). The resultant resin is grindable but when used in the molding of two plates as described above, the two plates are completely unsatisfactory because of holes in center, short corners, short sides and porosity.

EXAMPLE XXIV

60/40 PFR/PFN With Hexa During Grafting (25% Water Removed From PFN)

(a) Into equipment as used in Example I there is placed 1500 gms of USP phenol, 166 gms of water, 100 gms of hexa, 1800 gms of water and 364 gms of paraformaldehyde (95%). A small amount of the caustic solution is added and the heat turned on. The remainder of the caustic solution is added slowly and the mixture is heated to 90° C. and held at this temperature for 30 minutes. At this point the mixture is cooled to 85° C. and held here for 60 minutes. Then atmospheric distillation is effected until 264 gms of water is collected, (25% of the amount that is collected when all the water is removed) at which time the product (45.5% solids) is cooled and used as directed below in (b).

(b) Into a 4-liter resin flask equipped with a 4-necked top bearing a thermometer, reflux condenser, mechanical stirrer and stopper is placed 1142 grams (12.15 moles) USP phenol and 799 grams (13.85 moles) aqueous formaldehyde (52%). This is cooled to 39° C. and there are added 51.7 gms of hexa and 5.33 gms (0.133 moles) of flake sodium hydroxide. This mixture is heated to 90° C. over a period of 30 minutes and held at 90° C. for 30 minutes. The reflux condenser is then replaced with a vacuum distillation apparatus and the batch cooled rapidly by vacuum distillation at 26" of vacuum, to a temperature of 63° C. To this mixture there is added 2045 gms of the phenol formaldehyde Novolac (PFN) from (a). When the addition is complete, the vessel is closed and vacuum distillation is effected at 24" of mercury vacuum to a temperature of 70° C. At this point a continuous reading watt meter attached to the drive motor reads 120 watts at a speed setting of 5. The resin is discharged to a pan to cool.

The resultant grafted resin is compounded and molded according to the procedure described above into four plates, none of which is satisfactory. All four have pores and in addition two have knitlines, hole in center and slight short corners.

EXAMPLE XXV

60/40 PFR/PRN With Hexa During Grafting (50% Water Removed From PFN)

The procedure of XXIV is repeated except that 50% of the water is removed from the Novolac (a) before it is added to the resol components in (b). The resultant grafted resin is compounded and molded according to the procedure described above into three plates, none of which is satisfactory. All three plates have short corners and pores and one also has short sides.

The following Examples XXVI through XXIX demonstrate the use of PFR/PFUN in which only enough hexa is added to affect the resol and none for the grafting operation, with varying amounts of water removed from the Novolac prior to its addition to the resol components. None of the procedures of these examples produce satisfactory plates.

EXAMPLE XXVI

60/40 PFR/PFUN Without Hexa During Grafting (25% Water Removed From PFUN)

(a) Into a 4 liter resin vessel equipped with a mechanical stirrer, distillation condenser, heating mantel and thermometer is placed 2000 gms (21.28 moles) of USP phenol and 1480 gms (15.25 moles) of furfural. This mixture is heated to 65° C. and 30.0 gms (0.36 mole) sodium carbonate added. The charge is then slowly heated to 121° C. at which temperature the heating mantel is removed. The reaction then becomes exothermic and the temperature continues to rise until boiling begins at 135° C. The distillate is collected in a separating device with furfural returned to the reaction mixture until 64.7 gms of water (25% of the water) is collected. Temperature is decreased and 20 gms of emery oil is added and stirred for 5 minutes. The resultant resin is discharged from the vessel and saved for use in (b).

(b) Into a 4 liter resin flask equipped with a 4-necked top bearing a thermometer, reflux condenser, mechanical stirrer and stopper is placed 1142 gms (12.15 moles) phenol, 799 grams (13.85) formaldehyde (52%). This mixture is heated to 90° C. over a period of 30 minutes and held at 90° C. for 30 minutes. The reflux condenser is then replaced with a vacuum distillation apparatus and the batch cooled rapidly by vacuum distillation at 26" of mercury to a temperature of 63° C. With a heating mantel variable resistor set at 56, 1667 gms of the phenol-furfural Novolac (PFUN) from (a) is added. During the addition, the temperature is allowed to rise slowly to 64° C. When the addition is complete, the vessel is closed and vacuum distillation is effected at 26" of mercury vacuum to a temperature of 92° C. At this point a continuous reading watt meter attached to the drive motor reads 110 watts at a speed setting of 5. The resin is discharged to a pan to cool.

The resultant resin is molded into five plates as described above. All five plates are defective with each of the five having short corners, short sides and knitlines.

EXAMPLE XXVII

60/40 PFR/PFUN Without Hexa During Grafting (50% Water Removed From PFUN)

The procedure of Example XXVI is repeated except that 50% of the water is removed from the Novolac (PFUN) prior to its addition to the resol in (b). The resultant resin is likewise molded into five plates as described above, each of which proves to be unsatisfactory, all four of them having short corners, short sides and knitlines, with three of them also having blisters.

EXAMPLE XXVIII

60/40 PFR/PFUN Without Hexa During Grafting (75% Water Removed From PFUN)

The procedure of Example XXVI is repeated except that 75% of the water is removed from the Novolac (PFUN) prior to its addition to the resol in (b). The resultant resin is likewise molded into four plates as described above. All four plates are unsatisfactory, each having short corners, short sides and knitlines, with three also having blisters and one of these three also having pores.

EXAMPLE XXIX

60/40 PFR/PFUN Without Hexa During Grafting (100% Water Removed From PFUN)

The procedure of Example XXVI is repeated except that all (100%) of the water is removed from the Novolac (PFUN) prior to its addition to the resol in (b). The resultant resin is likewise molded into four plates as described above. All four plates are unsatisfactory, each having short corners and knitlines, with three also having blisters.

The following Examples XXX through XXXIII demonstrate the use of PFR/PFUN in which additional hexa is used for the grafting operation and are designated as "With Hexa". Varying amounts of water is removed from the Novolac (PFUN) prior to its addition to the resol components. Plate production from these resins are much more satisfactory.

EXAMPLE XXX

60/40 PFR/PFUN With Hexa During Grafting (25% Water Removed From PFUN)

(a) A phenol-furfuraldehyde Novolac (PFUN) is prepared according to the procedure of Example XXVI(a) in which in the water removal step only 25% of the water is removed.

(b) Into a 4 liter resin flask equipped with a 4-necked top bearing a thermometer, reflux condenser, mechanical stirrer and stopper is placed 1142 gms (12.15 moles) phenol and 799 grams (13.85 moles) formaldehyde (52%). The mixture is cooled to 39° C. and 5.33 gms of flake NaOH is added. This mixture is heated to 90° C. over a period of 30 minutes and held at 90° C. for 30 minutes. The reflux condenser is then replaced with a vacuum distillation apparatus and the batch cooled rapidly by vacuum distillation at 26" of mercury to a temperature of 63° C. With a heating mantel variable resistor set at 56, 1667 gms of the phenol-furfural Novolac (PFUN) from (a) is added. During the addition, the temperature is allowed to rise slowly to 64° C. When the addition is complete, the vessel is closed and vacuum distillation is effected at 26" of mercury vacuum to a temperature of 90° C. At this point a continuous reading watt meter attached to the drive motor reads 120 watts at a speed setting of 5. The resin is discharged to a pan to cool.

The resultant resin is molded into five plates as described above. Two plates have no flaws, one has no flaws except for a very slight bubble and two have short corners.

EXAMPLE XXXI

60/40 PFR/PFUN With Hexa During Grafting (50% Water Removed From Novolac)

(a) A phenol-furfuraldehyde Novolac (PFUN) is prepared according to the procedure of Example XXVI(a) except that in the water removal step 50% of the water is removed.

(b) In a separate reactor the procedure of Example XXX(b) is repeated using the Novolac of Example XXXI(a) in place of the Novolac used in Example XXX. Three plates are molded from this resin according to the above-described procedure. All three plates are free of flaws.

EXAMPLE XXXII

60/40 PFR/PFUN With Hexa During Grafting (75% Water Removed From Novolac)

(a) A phenol-furfuraldehyde Novolac (PFUN) is prepared according to the procedure of Example XXVI(a) except that in the water removal step 75% of the water is removed.

(b) In a separate reactor the procedure of Example XXX(b) is repeated using the Novolac of Example XXXII(a) in place of the Novolac used in Example XXX(b). Three plates are molded from this resin according to the above-described procedure. Two of the plates have no flaws and the third has a very slight short corner.

EXAMPLE XXXIII

60/40 PFR/PFUN With Hexa During Grafting (100% Water Removed From Novolac)

A grafted PFR/PFUN copolymer is prepared in accordance with the procedure of Example VIII with substantially complete water removal from the Novolac. Eight plates are molded from this resin. All eight plates are free of flaws.

The results from the moldings of plates from Examples XVII through XXXIII are summarized below in Table B. As indicated in the respective examples the resol/Novolac ratio is 60/40 in each case. In each case the resol is phenol-formaldehyde resol (PFR). The abbreviations are as defined above.

TABLE B

| Resin from Ex. | Novolac | % Water Removed From Novolac | Hexa Added? | Plate No. | Flaws |
|---|---|---|---|---|---|
| XVII* | PFN | None | No | 10A | SC,SS,KL,H |
| XVIII** | PFN | None | No | 10B | SC,SS,KL,H |
| XIX*** | PFN | None | No | 54 | SC,SS,P,KL |
| " | " | " | " | 55 | SC,SS,P,H |
| " | " | " | " | 56 | SC,P |
| XX | PFN | 25 | No | 5 | SS,H,P |
| " | " | " | " | 6 | SC,SS,HP |
| " | " | " | " | 7 | H,P |
| XXI | PFN | 50 | No | 11 | P |
| " | " | " | " | 12 | None |
| " | " | " | " | 13 | SS,P |
| " | " | " | " | 14 | H,SC,SS,P |
| " | " | " | " | 15 | H,SC |
| XXII | PFN | 75 | No | 16A | SC,SS |
| XXIII | PFN | 100 | No | 52 | SC,SS,HC,P (Does not form plate) |
| " | " | " | " | 53 | SC,SS,HC,P (Does not form plate) |
| XXIV | PFN | 25 | Yes | 1 | K,P,H,SSC |
| XXIV | PFN | 25 | Yes | 2 | P |
| " | " | " | " | 3 | P |
| " | " | " | " | 4 | P |
| XXV | PFN | 50 | Yes | 8 | SC,P |
| " | " | " | " | 9 | SC,P |
| " | " | " | " | 10 | SC,P,SS |
| XXVI | PFUN | 25 | No | 21 | SC,SS,KL |
| " | " | " | " | 22 | SC,SS,KL |
| " | " | " | " | 23 | SC,SS,KL |
| " | " | " | " | 24 | SC,SS,KL |
| " | " | " | " | 25 | SC,SS,KL |
| XXVII | PFUN | 50 | No | 29 | SC,SS,KL,B |
| " | " | " | " | 30 | SC,SS,KL |
| " | " | " | " | 31 | SC,SS,KL,B |
| " | " | " | " | 32 | SC,SS,KL,B |
| XVIII | PFUN | 75 | No | 36 | SC,SS,KL |
| " | " | " | " | 37 | SC,SS,KL,B |
| " | " | " | " | 38 | SC,SS,KL,B,P |
| " | " | " | " | 39 | SC,SS,KL,B |
| XXIX | PFUN | 100 | No | 44 | SC,KL,B |
| " | " | " | " | 45 | SC,KL |

TABLE B-continued

| Resin from Ex. | Novolac | % Water Removed From Novolac | Hexa Added? | Plate No. | Flaws |
|---|---|---|---|---|---|
| " | " | " | " | 46 | SC,KL,B |
| " | " | " | " | 47 | SC,KL,B |
| XXX | PFUN | 25 | Yes | 16 | None |
| " | " | " | " | 17 | SC |
| " | " | " | " | 18 | None except for slight bubble |
| " | " | " | " | 19 | None |
| " | " | " | " | 20 | SC |
| XXXI | PFUN | 50 | Yes | 26 | None |
| " | " | " | " | 27 | None |
| " | " | " | " | 28 | None |
| XXXII | PFUN | 75 | Yes | 33 | SSC |
| " | " | " | " | 34 | None |
| " | " | " | " | 35 | None |
| XXXIII | PFUN | 100 | Yes | 40 | None |
| " | " | " | " | 41 | None |
| " | " | " | " | 42 | None |
| " | " | " | " | 43 | None |
| " | " | " | " | 48 | None |
| " | " | " | " | 49 | None |
| " | " | " | " | 50 | None |
| " | " | " | " | 51 | None |

*Jap. Pat. Ex. 3
**Jap. Pat. Ex. 4
***Rice Pat. Ex. 1

As will be observed from examination of the results reported in the above TABLE B, none of the PFR/PFN combinations, with or without the addition of hexa, produced a grafted copolymer that is capable of being molded into plates as described in which the plates are without flaws (except for plate No. 12), or in other words satisfactory for subsequent carbonizing to vitreous carbon plates. In summary only one of the 23 plates formed is satisfactory.

Likewise, when the resin combination is PFR/PFUN and hexa is omitted, of the 17 plates formed, none is free of flaws or in other words none is satisfactory for subsequent carbonizing to vitreous carbon plates.

When hexa is added to the PFR/PFUN grafting operation, of the 19 plates formed, only three are unsatisfactory as having one flaw, one is borderline and the 15 others are free of flaws and satisfactory for carbonizing to vitreous carbon plates.

In other words, 95.8% of the PFR/PFN plates, with or without hexa, are unsatisfactory and have flaws which make them unsatisfactory for subsequent carbonization to vitreous carbon plates. Likewise, when the hexa is omitted in the grafting of PFR/PFUN resins, 100% or 17 out of the 17 plates prepared have flaws that make them unsatisfactory for subsequent carbonization to vitreous carbon plates.

In contrast, the PFR/PFUN combinations of this invention in which at least 25% of the water is removed from the Novolac and sufficient hexa is added for the grafting operation, show that of the 19 plates molded only 3 or possibly 4, that is 15.8% or 21%, have flaws, with 84.2% or 79% free of flaws. In a more preferred range of having 50%–75% of the water removed from the Novolac before use in the grafting operation, out of 6 plates there is only one plate that has a defect, or in other words, 17%, with 83% of the plates without flaws and satisfactory for carbonization to vitreous carbon. Also as stated above, when substantially 100% of the water is removed from the PFUN Novolac prior to addition, the plates are 100% flawless and suitable for subsequent carbonization to vitreous carbon plates.

From the above it is concluded that the grafted combination of formaldehyde phenol resol with formaldehyde-furfuraldehyde in which at least 25% advantageously at least 35%, preferably at least 50% or 75% of the water present during the Novolac preparation is removed prior to addition to the mixture of resol components or during the early stage of resol formation. Ideally substantially all of the water is removed from the Novolac before such addition.

As discussed above the hexa may be replaced by amines. Such amines should have one or more nitrogen atoms with at least one hydrogen attached to a nitrogen therein. In the reaction described herein it appears that there may be only one reaction per nitrogen atom having hydrogen attached thereto. In the case of hexa there are four nitrogens capable of reaction even though these do not have hydrogen attached thereto. The equivalent weight of hexa is therefore the molecular weight divided by 4, or 140/4 or 35. With the other amines the equivalent weight in each case is the molecular weight of an amine divided by the number of nitrogen atoms that have at least one hydrogen attached. For example ethyl amine has an equivalent weight of 45/1 or 45. Ethylene diamine has an equivalent weight of 60/2 or 30.

EXAMPLE XXXIV

The procedures of Examples I, VIII, XIII and XIV are repeated a number of times using in place of the 57.1 grams (0.41 mole) of hexamethylenetetramine of Example VIII the following equivalent amounts respectively of the following amins:
- (a) 73.4 gms of ethylamine
- (b) 73.4 gms of dimethyl amine
- (c) 152.5 gms of aniline
- (d) 49.2 gms of ethylene diamine
- (e) 88.6 gms of phenylene diamine
- (f) 111.5 gms of N,N'-dimethyl-phenylene diamine
- (g) 175.4 gms of N-methyl aniline
- (h) 72.2 gms of N,N'-dimethyl-ethylene diamine
- (i) 65.6 gms of propylene-diamine
- (j) 139.4 gms of piperidine
- (k) 77.1 gms of piperazine In each case a grafted copolymer is produced in the repetitions of Example VIII, plates are molded without flaws in the repetitions of Example XIII and these are satisfactorily carbonized to vitreous carbon plates by the procedure of Example XIV.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

The invention claimed is:

1. A process for preparing a vitreous carbon of improved freedom from pits and holes and much less subject to cracking and failure during formation and use, comprising the steps of:
   (1) molding a moldable composition of improved mold flow properties prepared by the addition of a phenolic-aldehyde Novolac resin in which at least 50 molar percent of said aldehyde is furfuraldehyde to an aqueous solution or suspension of a phenolic-aldehyde resol resin prior to the removal of 90 percent of the removable water from said resol resin solution or suspension, the proportions of said resins comprising 20-80 parts by weight of said Novolac resin and 20-80 parts by weight of said resol resin with the combined weight of said two resins comprising 100 parts by weight, thereafter effecting coreaction of said resins together with an amine selected from the group consisting of hexamethylenetetramine and amines in which there is at least one hydrogen connected to a nitrogen atom, the amount of said amine being equivalent to 1-15 percent by weight of hexamethylenetetramine based on the total weight of phenolic component, and removal of water from the resulting reaction mass while maintaining the resin in a moldable condition, the Novolac resin having been prepared with the removal of at least 25 percent by weight of the water removable during the Novolac preparation, and prior to said molding intimately mixing said coreacted resins with 5-76 percent by weight of a finely divided carbonaceous filler based on total molding composition, said molding being effected at a temperature of 100°-180° C. and a pressure between 500 pounds per square inch and 8 tons per square inch; and
   (2) heating the resultant molded product gradually up to a final temperature of at least 1800° and holding at said final temperature for at least 24 hours.

2. The process of claim 1 in which said amine is hexamethylenetetramine and the carbonaceous filler is 35-65 percent by weight of the total moldable composition.

3. The process of claim 1 in which the amount of said amine is equivalent to 2-8 parts by weight of hexamethylenetetramine per 100 parts by weight of said Novolac resin.

4. The process of claim 3 in which said amine is hexamethylenetetramine.

5. The process of claim 2 in which the phenolic component in the Novolac is phenol.

6. The process of claim 5 in which the phenolic component in the resol is phenol and the aldehyde in the resol is formaldehyde.

7. The process of claim 6 in which the furfuraldehyde content in said Novolac is at least 75 molar percent of the aldehyde component.

8. The process of claim 6 in which the furfuraldehyde in said Novolac is approximately 100 molar percent of the aldehyde component.

9. The process of any one of claims 1, 2, 3, 4, 5, 6, 7 or 8 in which said Novolac addition is performed after sufficient refluxing is effected for substantially complete reaction of the resol aldehyde.

10. The process of claim 8 in which said Novolac is added prior to initiation of said water removal from said resin solution or suspension.

11. The process of claim 8 in which said Novolac is added prior to removal of 25 percent of the water in said resol resin solution or suspension.

12. The process of claim 8 in which said Novolac is substantially completely free of water prior to said addition.

13. The process of claim 8 in which at least 35 percent by weight of the water initially present in said Novolac preparation is removed prior to said addition.

14. The process of claim 2 in which the carbonaceous filler is finely divided graphite and said moldable composition contains 35-65 percent by weight of said finely divided graphite.

15. The process of claim 8 in which the carbonaceous filler is finely divided graphite and said moldable composition contains 35-65 percent by weight of said finely divided graphite.

16. The process of claim 12 in which the carbonaceous filler is finely divided graphite and said moldable composition contains 35-65 percent by weight of said finely divided graphite.

17. The process of claim 4 in which said molded product is a plate having a thickness of 0.04-0.05 inch.

18. The process of claim 17 in which said molding is effected at a pressure of 800 to 1500 pounds per square inch.

19. The process of claim 18 in which the ratio of parts by weight of said resol resin to parts by weight of said Novolac is in the range of 70/30 to 50/50.

20. The process of claim 19 in which said final temperature is at least 2000° F.

21. The process of claim 19 in which said final temperature is at least 3000° F.

22. The process of claim 19 in which said resultant molded product is heated gradually up to a temperature of 600°-700° F. with the temperature increased at a rate of 105° F. per hour, then above the range of 600°-700° F. at an increasing rate of 10°-15° F. per hour up to 800°-850° F. and thereafter at 20°-25° F. per hour up to a final temperature of 1800°-3000° F., which final temperature is held for at least 24 hours.

23. The process of any of claims 1, 2, 3, 4, 5, 6, 7, 11, 13 or 15 in which said molding is effected at a pressure of 800-1500 pounds per square inch.

24. The process of claim 15 in which said hexamethylenetetramine is used in a proportion of 1 to 5 percent by weight based on the weight of resin product.

25. The process of claim 14 in which said Novolac resin is added prior to the removal of 50 percent of the removable water from said resol resin solution or suspension.

26. The process of claim 25 in which said amine is hexamethylenetetramine, the phenol component in both said Novolac and said resol resins is phenol and the aldehyde in said resol resin is formaldehyde.

27. The process of claim 26 in which the furfuraldehyde is at least 75 molar percent of the aldehyde component.

28. The process of claim 14 in which said Novolac resin is added prior to the removal of 75 percent of the removable water from said resol resin solution or suspension.

29. The process of claim 28 in which said amine is hexamethylenetetramine, the phenol component in both said Novolac and said resol resins is phenol and the aldehyde in said resol resin is formaldehyde.

30. The process of claim 29 in which the furfuraldehyde is approximately 100 molar percent of the aldehyde component.

31. The process of claim 30 in which the amount of graphite is 40–60 percent by weight of the total moldable composition.

* * * * *